(12) United States Patent
Delaney et al.

(10) Patent No.: US 11,431,843 B1
(45) Date of Patent: *Aug. 30, 2022

(54) NON-ASSOCIATIVE TELEPHONY AND SMS MESSAGING

(71) Applicant: Berryville Holdings, LLC, Herndon, VA (US)

(72) Inventors: Christopher Edward Delaney, Front Royal, VA (US); Chava Louis Jurado, Leesburg, VA (US); Carl Bailey Jacobs, Fredericksburg, VA (US); William Theodore Schoon, Greer, SC (US)

(73) Assignee: Cyber IP Holdings, LLC, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/951,029

(22) Filed: Nov. 18, 2020

Related U.S. Application Data

(63) Continuation of application No. 15/930,549, filed on May 13, 2020, now Pat. No. 10,880,432.

(60) Provisional application No. 62/852,414, filed on May 24, 2019.

(51) Int. Cl.
| | |
|---|---|
| *H04W 4/00* | (2018.01) |
| *H04M 3/42* | (2006.01) |
| *H04M 7/00* | (2006.01) |
| *H04L 65/10* | (2022.01) |

(52) U.S. Cl.
CPC .... *H04M 3/42382* (2013.01); *H04L 65/1006* (2013.01); *H04M 3/42059* (2013.01); *H04M 3/42323* (2013.01); *H04M 7/006* (2013.01)

(58) Field of Classification Search
CPC ........ H04M 3/42382; H04M 3/42323; H04M 7/006; H04M 3/42059; H04L 65/1006
USPC .......................................................... 455/466
See application file for complete search history.

(56) References Cited

U.S. PATENT DOCUMENTS

| | | | |
|---|---|---|---|
| 7,508,923 B1 | 3/2009 | Samaarasinghe | |
| 7,627,338 B2 * | 12/2009 | Hicks, III | H04M 3/42246 455/552.1 |
| 7,715,401 B2 * | 5/2010 | Yoshimoto | H04L 65/1006 370/395.21 |
| 7,738,442 B2 * | 6/2010 | Miyamoto | H04L 29/06027 370/396 |
| 7,904,068 B2 * | 3/2011 | Hicks, III | H04M 3/42246 455/417 |
| 7,920,692 B2 | 4/2011 | Olshansky et al. | |

(Continued)

*Primary Examiner* — Amancio Gonzalez
(74) *Attorney, Agent, or Firm* — Jones Day

(57) ABSTRACT

Systems and methods for managing non-associative communications between devices is provided. A first call chain that indicates a routing between phone numbers is stored. A first phone call or a first SMS text is received from a first session initiation protocol (SIP) provider. Based on information provided by the first SIP provider, (i) a sender identity of the first phone call or the first SMS text; (ii) a receiver identity of the first phone call or the first SMS text; and (iii) an access mode of the call chain are determined. If the receiver identity corresponds to a first phone number in the first call chain, a second phone call or a second SMS text is initiated via a second SIP provider, from a second phone number in the first call chain, based on the sender identity and the access mode.

20 Claims, 12 Drawing Sheets

(56) References Cited

U.S. PATENT DOCUMENTS

| | | | |
|---|---|---|---|
| 8,218,748 B2* | 7/2012 | Kondapalli | H04M 3/5158 |
| | | | 379/201.02 |
| 8,463,253 B2* | 6/2013 | Chipalkatti | H04W 12/086 |
| | | | 455/418 |
| 9,715,688 B1* | 7/2017 | Koster | H04M 3/5231 |
| 10,735,474 B2* | 8/2020 | Davis | H04L 65/80 |
| 2007/0248077 A1* | 10/2007 | Mahle, Jr. | H04L 29/06027 |
| | | | 370/352 |

* cited by examiner

NON-ASSOCIATIVE TELEPHONY AND SMS MESSAGING

CROSS-REFERENCE TO RELATED APPLICATIONS

This application is a continuation application of U.S. patent application Ser. No. 15/930,549, filed May 13, 2020, which claims priority to U.S. Provisional Application No. 62/852,414, filed May 24, 2019, both of which are incorporated herein by reference in their entireties.

TECHNICAL FIELD

The technology described herein relates to secure communications and more particularly to secure communications that use Voice-over-IP (VoIP) telephony.

BACKGROUND

VoIP telephony is an established technology and allows organizations to operate their own digital Private Branch Exchange (PBX) servers and digital telephone architectures as a way of providing tailored communications solutions to their employees and/or customers.

Most VoIP infrastructure is implemented using the Session Initiation Protocol (SIP), which is a way to initiate an audio session between two or more VoIP handset devices (either physical VoIP telephones, or mobile or desktop computers running VoIP software).

Companies referred to as "SIP Providers" offer a way to bridge VoIP with the Public Switched Telephone Network (PSTN) so that users on a private VoIP PBX can make phone calls to and receive phone calls from people on the standard global telephony infrastructure. Many SIP Providers also provide bridge service for Short Message Service (SMS) messages, so that users on a PBX can exchange SMS messages with mobile users on SMS-capable cellular devices.

When users on a PBX make or receive phone calls or send or receive SMS text messages with mobile users on the standard global telephony infrastructure, records of that communication typically exist on device and/or in cellular provider call records.

SUMMARY

A method for managing non-associative communications between devices is provided. A first call chain that indicates a routing between phone numbers is stored. A first phone call or a first SMS text is received from a first session initiation protocol (SIP) provider. Based on information provided by the first SIP provider: (i) a sender identity of the first phone call or the first SMS text, (ii) a receiver identity of the first phone call or the first SMS text, and (iii) an access mode of the call chain are determined. If the receiver identity corresponds to a first phone number in the first call chain, a second phone call or a second SMS text is initiated via a second SIP provider, from a second phone number in the first call chain, based on the sender identity and the access mode. Data is received from a first device corresponding to the sender identity. The data is forwarded to a second device corresponding to the receiver identity. If the receiver identity does not correspond to a first phone number in the first call chain, a connection from the first device to the second device is blocked.

As another example, a system for managing non-associative communications between devices is provided. The system comprises a server configured to store a first call chain that indicates a routing between phone numbers. The server receives, from a first session initiation protocol (SIP) provider, a first phone call or a first SMS text. The server determines, based on information provided by the first SIP provider: (i) a sender identity of the first phone call or the first SMS text, (ii) a receiver identity of the first phone call or the first SMS text, and (iii) an access mode of the call chain. If the receiver identity corresponds to a first phone number in the first call chain, the server initiates, via a second SIP provider, from a second phone number in the first call chain, a second phone call or a second SMS text based on the sender identity and the access mode. The server receives data from a first device corresponding to the sender identity. The server forwards the data to a second device corresponding to the receiver identity. If the receiver identity does not correspond to a first phone number in the first call chain, the server blocks a connection from the first device to the second device.

As a further example, a non-transitory computer readable storage medium storing one or more programs configured to be executed by one or more data processors, the one or more programs comprising instructions for managing non-associative communications between devices, is provided. A first call chain that indicates a routing between phone numbers is stored. A first phone call or a first SMS text is received from a first session initiation protocol (SIP) provider. Based on information provided by the first SIP provider: (i) a sender identity of the first phone call or the first SMS text, (ii) a receiver identity of the first phone call or the first SMS text, and (iii) an access mode of the call chain are determined. If the receiver identity corresponds to a first phone number in the first call chain, a second phone call or a second SMS text is initiated via a second SIP provider, from a second phone number in the first call chain, based on the sender identity and the access mode. Data is received from a first device corresponding to the sender identity. The data is forwarded to a second device corresponding to the receiver identity. If the receiver identity does not correspond to a first phone number in the first call chain, a connection from the first device to the second device is blocked.

DETAILED DESCRIPTION

The systems and methods described herein provide a way for users to have telephone or SMS conversations with one another, while not revealing that any communication occurred between them to a third party with access to the PSTN system, the cellular provider call records, or the users' personal telephones. The systems and methods described provided herein facilitate the objectives of at least the following three example scenarios.

As one example, a person operating multiple businesses may, for whatever reason, wish to ensure that there exists no association between the multiple businesses, but may not wish to have to carry multiple cell phones in order to receive calls for the multiple businesses. Further, the person may wish to present a different persona when answering inbound calls from a particular party and making outbound calls to that particular party. Finally, the person may wish to communicate with other people while not revealing any of the contact he is having to third parties if his cell phone is stolen or otherwise compromised.

As a second example, there are times when SMS text messages sent to one number may be responded to by multiple people, without revealing to the sender that his message was responded to by someone other than a single person also using a cellular phone.

As a third example, there are times when a person wishes to be reachable via SMS text message, even though he is located where cellular connectivity is not available, either for infrastructure or administrative reasons.

Figure 1:
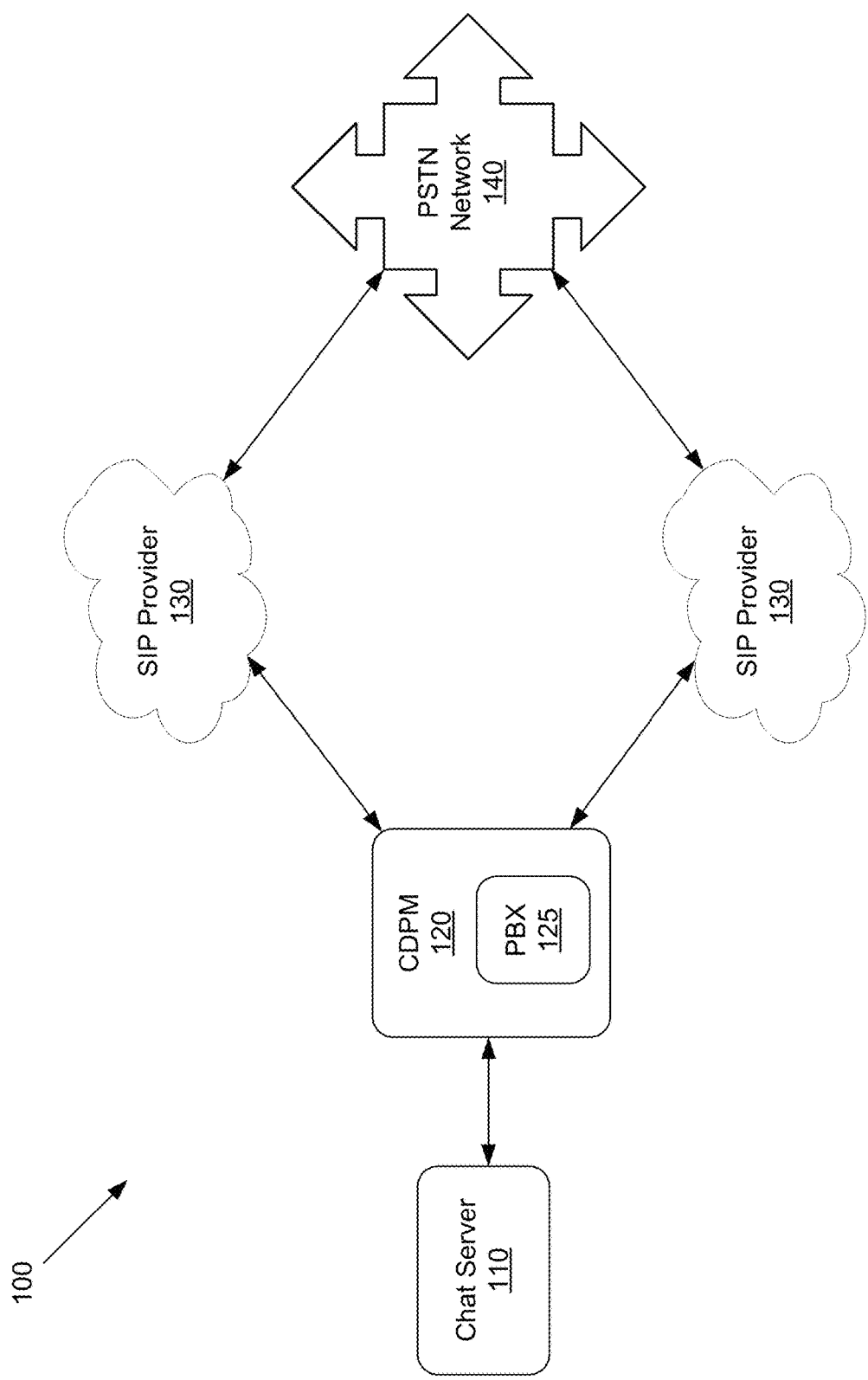
FIG. 1 depicts a system that provides communication dissociation and manages multiple personas for communication between multiple parties.

FIG. 1 depicts a system 100 that can provide communication dissociation and manage multiple personas for communication between multiple parties. The system 100 comprises a chat server 110, a communication disassociation and persona management (CDPM) module 120 with PBX 125, one or more SIP providers 130, and a PSTN network 140. The CDPM module 120 can be implemented as software running on a server host, either physical or virtual, located either on-premises or in the cloud. The CDPM module 120 can coexist with the PBX 125, e.g., a software implemented PBX like Asterisk. A system administrator can configure the CDPM module 120 with access credentials for the one or more SIP providers 130. For SMS-to-chat integration, the system administrator can configure the CDPM module 120 with access credentials for the chat server 110.

In order to establish a non-associative calling and/or messaging channel, at least two telephone numbers must be leased through the one or more SIP providers 130. Once the telephone numbers are leased, and the telephone numbers are made available to the CDPM module 120, a system administrator can create a "call chain" rule, which establishes an association between external phone number A and leased number B, between leased number B and leased number C, and between leased number C and external phone number D, such that when number A calls number B, the call will be forwarded internally through the CDPM module 120 and the one or more SIP providers 130 and ultimately reach number D. Likewise, if A and D are SMS-capable cellular numbers, if A sends an SMS message to B, the message will be forwarded through the CDPM module 120 and the one or more SIP providers 130, and ultimately reach number D. The reverse case is also true, such that if D initiates a call or SMS message to C, the call or message will be routed through the CDPM module 120 and the one or more SIP providers 130 and arrive at A.

A call chain may be configured in one of three modes. When either or both ends of a call chain is configured to allow only one particular number to call or send SMS messages to a specified leased number, the call chain is configured in "strict" mode. When either or both ends of the call chain is configured such that calls or SMS messages from any number to number B are routed through the CDPM module 120 and the one or more SIP providers 130 to arrive at D, and/or calls or SMS messages from any number to number C will be routed through the CDPM module 120 and the one or more SIP providers 130 to arrive at A, the call chain is configured in "open" mode. When either or both ends of the call chain is configured such that inbound calls from a particular number are routed through the CDPM module 120 and the one or more SIP providers 130 to reach the number at the opposite end of the chain, but inbound calls from any other number are routed to a configured external number, the call chain is configured in "default" mode.

Once the system administrator saves the call chain rule, the CDPM module 120 interacts with the Application Programming Interface (API) of the one or more SIP Providers 130 to establish the following behaviors: (1) when any landline or cellular number calls leased number B, the SIP provider that number B was leased from can forward the call, via a SIP/VoIP connection, to the PBX 125; and (2) when any landline or cellular number calls leased number C, the SIP Provider that number C was leased from can forward the call, via a SIP/VoIP connection, to the PBX 125. Any number of such call chain rules may be established by a system administrator. Once one or more such call chain rules are established, the CDPM module 120 can enter a dormant state, waiting for inbound calls to be received from the one or more SIP providers 130.

When the one or more SIP providers 130 receive a call from a caller to one of the leased numbers from a number on the PSTN or cellular network, the CDPM module 120 can perform the following steps:

(1) determine the caller's number from the information provided by the one or more SIP providers 130;

(2) determine which leased SIP number was called from the information provided by the one or more SIP providers 130;

(3) find the call chain that contains that leased number and make the following decision:

(a) if the caller corresponds to the external number associated with the leased number in the call chain, the CDPM module 120 can forward the call to the external number at the other end of the call chain, via its associated leased number;

(b) if the caller is not the external number associated with the leased number in the call chain, the CDPM module 120 can decide:

(i) if the end of the call chain is configured in "open" mode, the CDPM module 120 can forward the call to the external number at the other end of the call chain, via its associated leased number;

(ii) if the end of the call chain is configured in "default" mode, the CDPM module 120 can forward the call to the configured default external number for the chain; and (iii) if the end of the call chain is configured in "strict" mode, CDPM module 120 can terminate the call or responds with a "Your call cannot be completed" message as specified by the system administrator.

(4) if the call is to be forwarded to the other end of a call chain, the CDPM module 120 can make the following determination:

(a) determine the adjacent leased number associated with the leased number that was called;

(b) initiate, via the SIP provider's API, a call from that adjacent leased number to the associated external number;

(c) relay audio back and forth between the received call and the initiated call; and (d) detect when either of the external numbers terminates the call and terminate the call at the other end of the chain as well.

When the one or more SIP providers 130 receives an SMS message to one of the configured numbers from a sender on a cellular network, the CDPM module 120 can perform the following steps:

(1) determine the sender's number from the information provided to it by the one or more SIP providers 130;

(2) determine which leased number the message was sent to from the information provided to it by the one or more SIP providers 130;

(3) find the call chain that contains the leased number and make the following decision:

(a) if the sender corresponds to the external number associated with the leased number in the call chain, the CDPM module 120 can forward the SMS message to the external number at the other end of the call chain, via its associated leased number;

(b) if the sender does not correspond to the external number associated with the leased number in the call chain, the CDPM module 120 can decide:

(i) if the end of the call chain is configured in "open" mode, the CDPM module 120 can forward the SMS message to the external number at the other end of the call chain, via its associated SIP number; or (ii) if the end of the call chain is configured in "strict" mode, the CDPM module 120 can ignore the SMS message.

(4) if the SMS message is to be forwarded, the CDPM module 120 can:

(a) determine the leased number associated with the leased number that the SMS message was sent to;

(b) initiate, via the SIP provider's API, an SMS message from that leased number to the associated external number, with the message content being the same as in the inbound message.

In order to establish call identity management for n personas for a user, two times n numbers must be leased from the one or more SIP providers 130. Once the numbers have been leased, the system administrator creates n persona entries for the user and associates two of the leased numbers with each of the n personas. The first of the associated numbers is provided to third parties to reach the user. The second of the associated numbers is used to call the user, as described above. Optionally, one or more PBX-only extensions may be associated with the user.

When the system administrator establishes a persona, the CDPM module 120 can reach out to the one or more SIP providers 130 for the leased numbers associated with that persona, and configures the one or more SIP providers 130 such that when any landline or cellular number calls the leased number, the SIP provider associated with the leased number can forward the call, via SIP/VoIP connection, to the PBX 125.

The CDPM module 120 can reach out to the one or more SIP providers 130 for the leased number associated with that persona and configure the one or more SIP providers 130 such that when any landline or cellular number calls the leased number, SIP providers associated with the leased number will forward the call, via a SIP/VoIP connection, to the CDPM module 120. Once the call is forwarded, the CDPM module 120 can wait for the one or more SIP providers 130 to forward any inbound calls on any of these numbers. The user can disseminate the various persona numbers to people in the course of his business, giving the number for his first persona to one group of people, and the number for his second persona to a different group, and so on.

As further described with respect to FIGS. 2-5, communication dissociation is facilitated through the use of the CDPM module 120, the PBX 125, and the one or more SIP providers 130. As further described with respect to FIGS. 6-9, persona management is also facilitated through the use of the CDPM module 120, the PBX 125, and the one or more SIP providers 130. As further described with respect to FIGS. 10-11, a user is in a location where cellular connectivity is not available, either for infrastructure or administrative reasons, and SMS text message communication is facilitated through the use of the CDPM module 120, the chat server 110, the PBX 125, and the one or more SIP providers 130.

Figure 2:
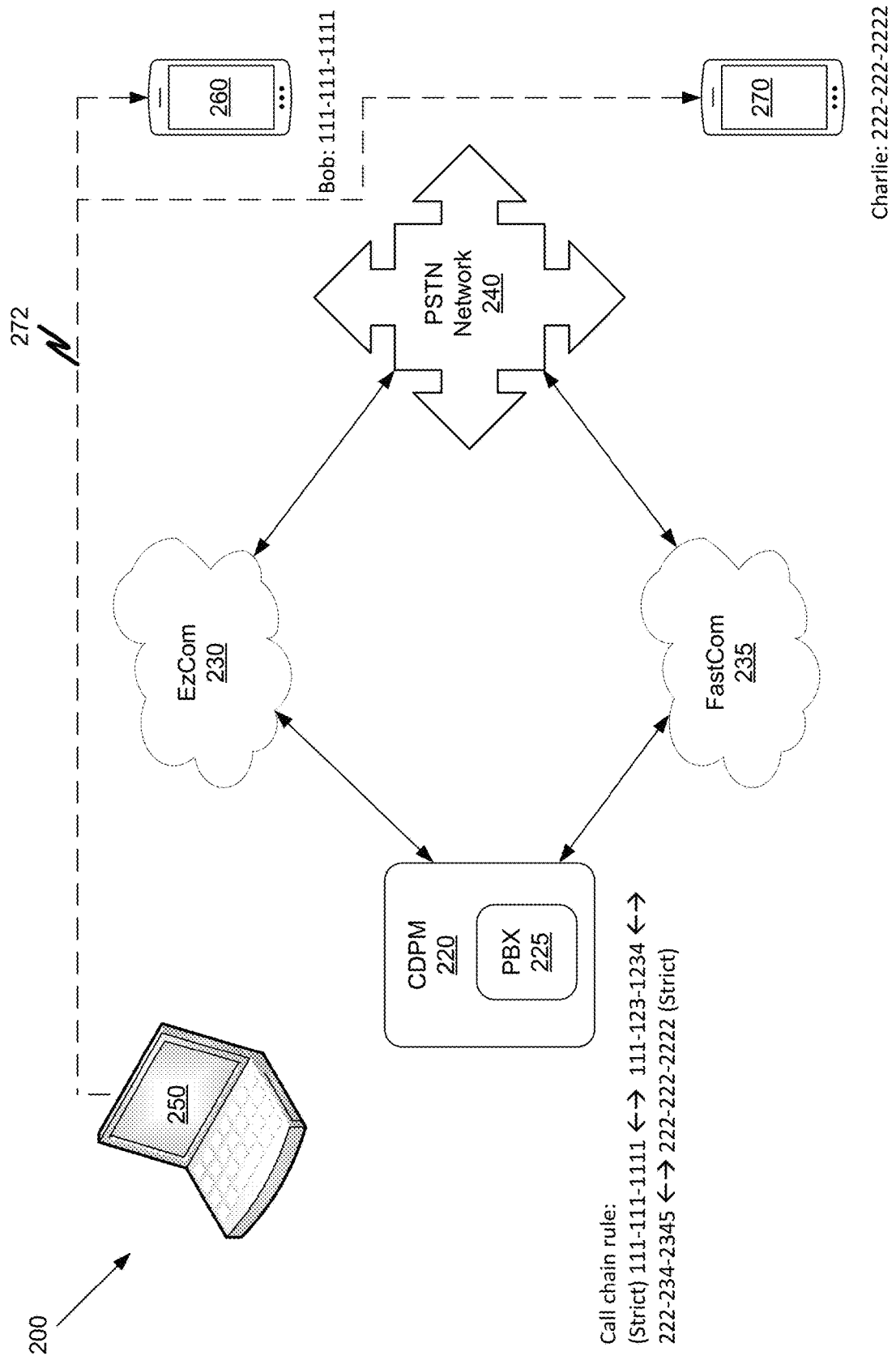
FIG. 2 depicts a setup of a system for facilitating non-associative telephonic and SMS text communications between users using a call chain in strict mode.

FIG. 2 depicts a setup of a system 200 for facilitating non-associative telephonic and SMS text communications between users using a call chain in strict mode. The system 200 comprises a CDPM module 220 with a PBX 225, two SIP providers EzCom 230 and FastCom 235, and a PSTN network 240. As an example, Alice is a system administrator using a laptop 250 with access to a CDPM console. Alice has accounts with the two SIP Providers EzCom 230 and FastCom 235. Alice wants to facilitate communications between Bob's device 260 with phone number 111-111-1111 and Charlie's device 270 with phone number 222-222-2222. Bob and Charlie want to have phone and SMS conversations without anyone knowing that they are communicating with one another, and without appearing to be communicating with someone outside of their normal pattern of life.

Alice visits the EzCom website and leases a number that is in the same area code as Bob: 111-123-1234. Alice visits the FastCom website and leases a number that is in the same area code as Charlie: 222-234-2345. Alice has already configured the CDPM module 220 with the credentials for her EzCom and FastCom accounts, so when she connects to the CDPM module 220 via the CDPM console, the numbers she has just leased are automatically listed as available for her use.

Alice creates a call chain in the CDPM module 220 between Bob and Charlie wherein: (1) Bob's number (111-111-1111) is at an end of the chain; (2) the leased number in Bob's area code (111-123-1234) is adjacent to Bob's number; (3) the leased number in Charlie's area code (222-234-2345) is adjacent to Charlie's number and to the leased number in Bob's area code; and (4) Charlie's number (222-222-2222) is at the other end of the chain. Alice sets both ends of the chain to "strict," so that no one can use the chain other than Bob and Charlie. At 272, Alice makes Bob and Charlie aware of the leased numbers that they should use to communicate with one another, via whatever means is appropriate to their situation.

Figure 3:
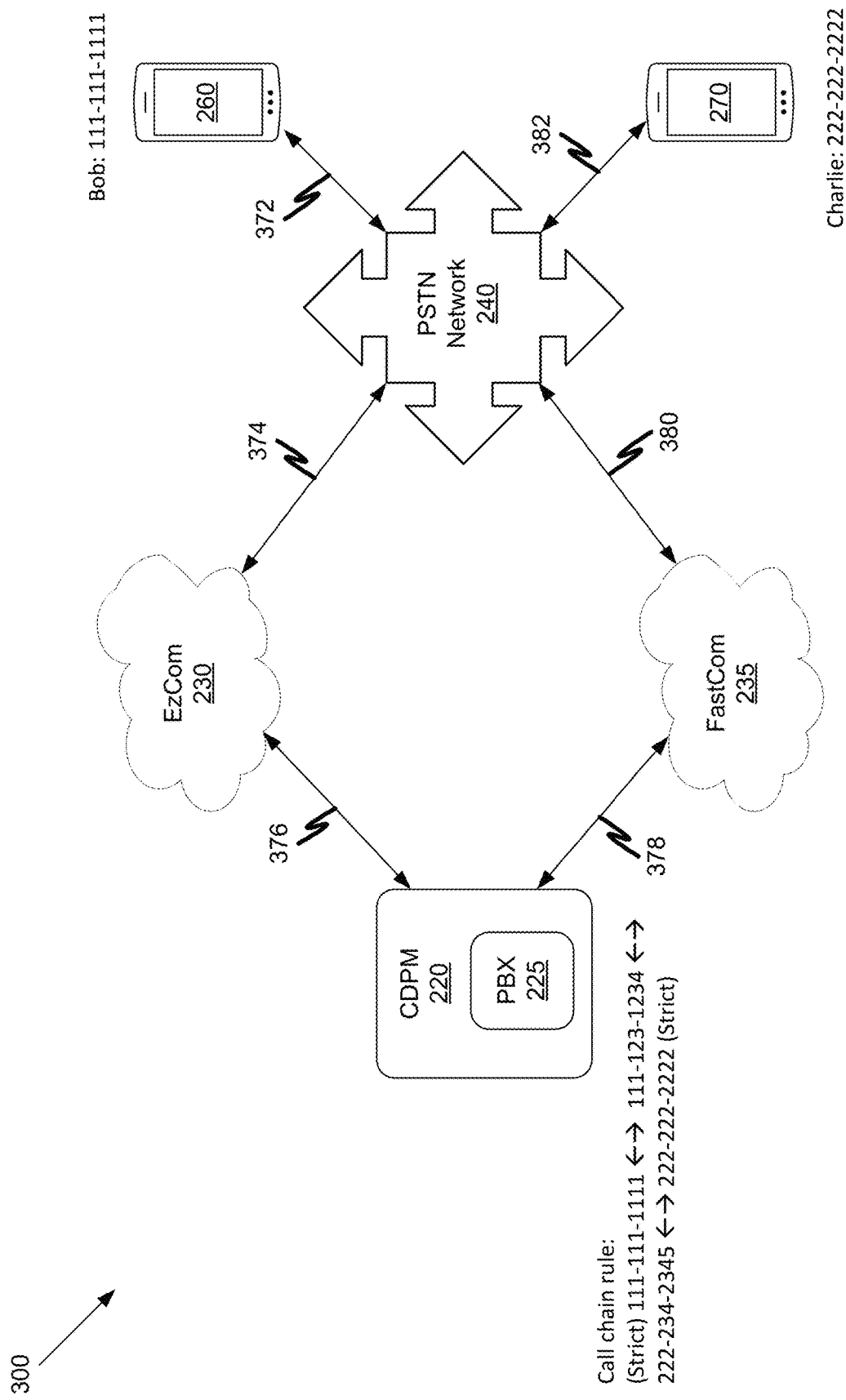
FIG. 3 depicts a deployment of a system for facilitating non-associative telephonic and SMS text communications between users using a call chain in strict mode.

FIG. 3 depicts a deployment of a system 300 for facilitating non-associative telephonic and SMS text communications between users using a call chain in strict mode. At 372, Bob dials the number he has been given to reach Charlie (111-123-1234) from his device 260 with the number 111-111-1111. At 374, the PSTN network 240 recognizes the number 111-123-1234 as belonging to EzCom 230 and forwards the call to EzCom 230.

EzCom 230 forwards the call to CDPM module 220 at 376. The CDPM module 220 sees that the call is for 111-123-1234, which is part of a call chain. The CDPM module 220 sees that the call chain is in "strict" mode, so it will only allow the call to proceed if it is from the configured endpoint of the call chain: 111-111-1111. The CDPM module 220 sees that the calling number (111-111-1111) is listed as the endpoint number associated with 111-123-1234, so it allows the call to proceed. The CDPM module 220 reaches out to FastCom 235 (from which the next number in the chain is leased) at 378 and directs it to place a call from that leased number, 222-234-2345, to Charlie's number, 222-222-2222 at 380. Once the call is placed and Charlie answers at 382, the CDPM module 220 marshals the call audio back and forth between the two calls on the two SIP providers, so that Bob and Charlie are able to converse telephonically.

Later, Charlie wants to send Bob an SMS text message. At 382, Charlie sends the message to the number he has been given to reach Bob: 222-234-2345 from his device 270. At 380, the message arrives at FastCom 235, from which Alice leased the number. FastCom forwards the SMS message to the CDPM module 220 at 378. The CDPM module 220 sees that the text message was sent to 222-234-2345, which is part of a call chain. The CDPM module 220 sees that the chain is in "strict" mode, so it will only allow the message to proceed if it is from the configured endpoint of the chain associated with that leased number: 222-222-2222. The CDPM module 220 sees that the message was sent from 222-222-2222, so it allows the message to proceed. At 376, the CDPM module 220 reaches out to EzCom 230, the SIP provider from which Alice leased the corresponding number in the chain: 111-123-1234. The CDPM module 120 directs EzCom 230 to send an SMS message from 111-123-1234 to the associated endpoint number, 111-111-1111, with the content of the message being what it received from FastCom 235 at 374. Bob receives the SMS message on the cell phone 260 at 372.

Once the message goes through, Charlie's device 270 has a record of sending a message to 222-234-2345, which is not Bob's actual number, and Bob's device 260 has a record of receiving a message from 111-123-1234, which is not Charlie's actual number. Neither user's phone's records have any numbers in common to show that they communicated with one another. In the aforementioned way, Bob and Charlie are able to have two-way communications, via phone call or SMS or both, while neither of them know one another's actual phone numbers. Further, if one of their phones is lost or stolen, there will be no record that they ever communicated.

Figure 4:
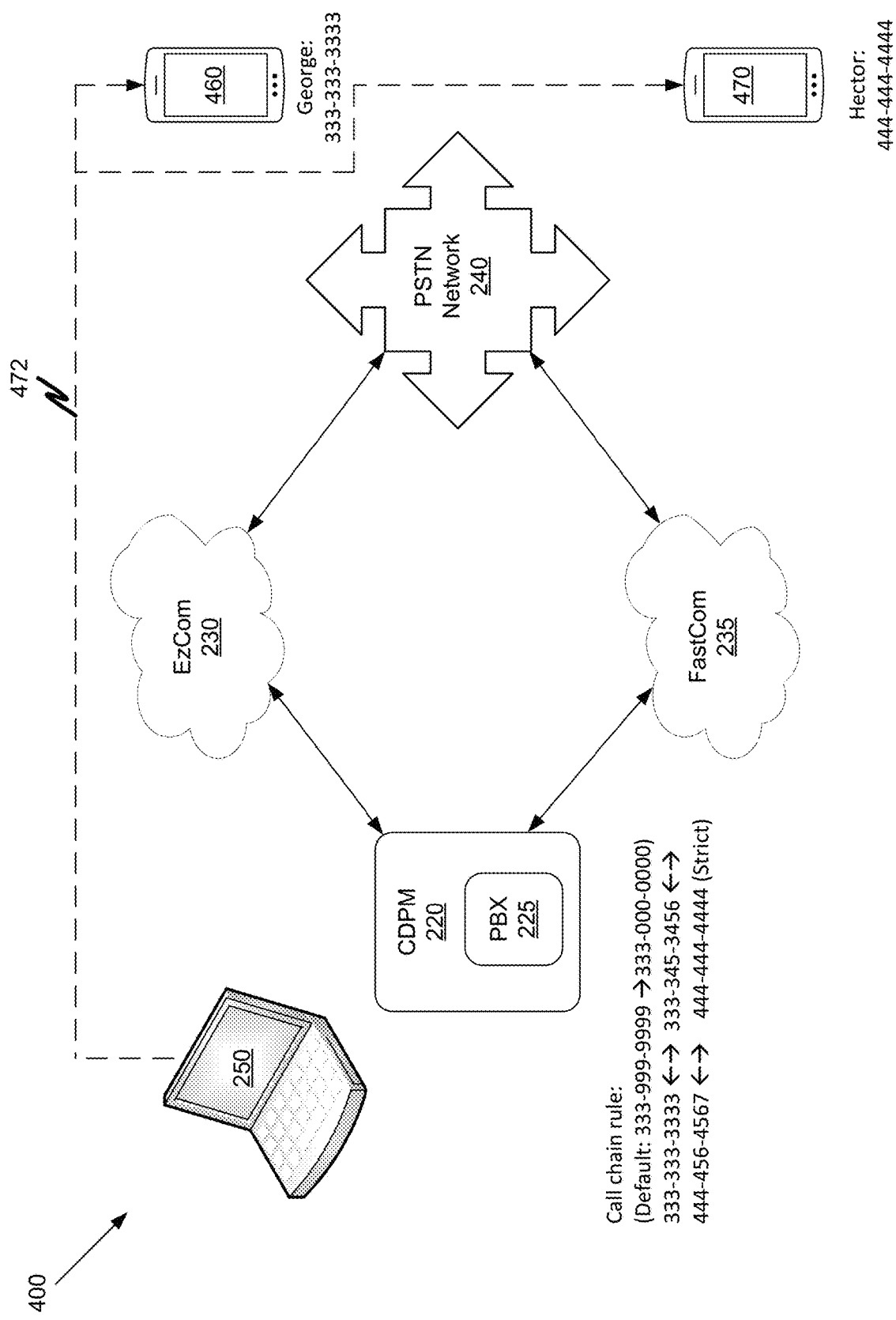
FIG. 4 depicts a setup of a system for facilitating non-associative telephonic and SMS text communications between users using a call chain in default mode.

FIG. 4 depicts setup of a system 400 for facilitating non-associative telephonic and SMS text communications between users using a call chain in default mode. As an example, Alice wants to facilitate communications between George's device 460 with number 333-333-3333 and Hector's device 470 with number 444-444-4444. For administrative reasons, it is decided that if someone sees over George's shoulder that he has called a particular number, it would be suspicious if that someone tried calling that particular number and got an error message, so Alice decides to use a chain with "default" mode on George's end.

Alice visits the EzCom website and leases two numbers that are in the same area code as George: 333-345-3456 and 333-999-9999. Alice visits the FastCom website and leases a number that is in the same area code as Hector: 444-456-4567. Alice researches and finds a pizza restaurant near George, and makes a note of the phone number: 333-000-0000. Once Alice has leased the numbers, the numbers are available in the CDPM module 220: 333-345-3456; 333-999-9999; and 444-456-4567. Alice connects via the CDPM console on the laptop 250 to the CDPM module 220 to create the following call chain: default (333-999-9999→333-000-0000), 333-333-3333←→333-345-3456←→444-456-4567←→444-444-4444 (strict). At 472, Alice disseminates to George and Hector the numbers they should use to speak to each another. Alice also communicates to George that anyone other than George who calls the number he uses to reach Hector will instead be redirected to LocalPizzaInc.

Figure 5:
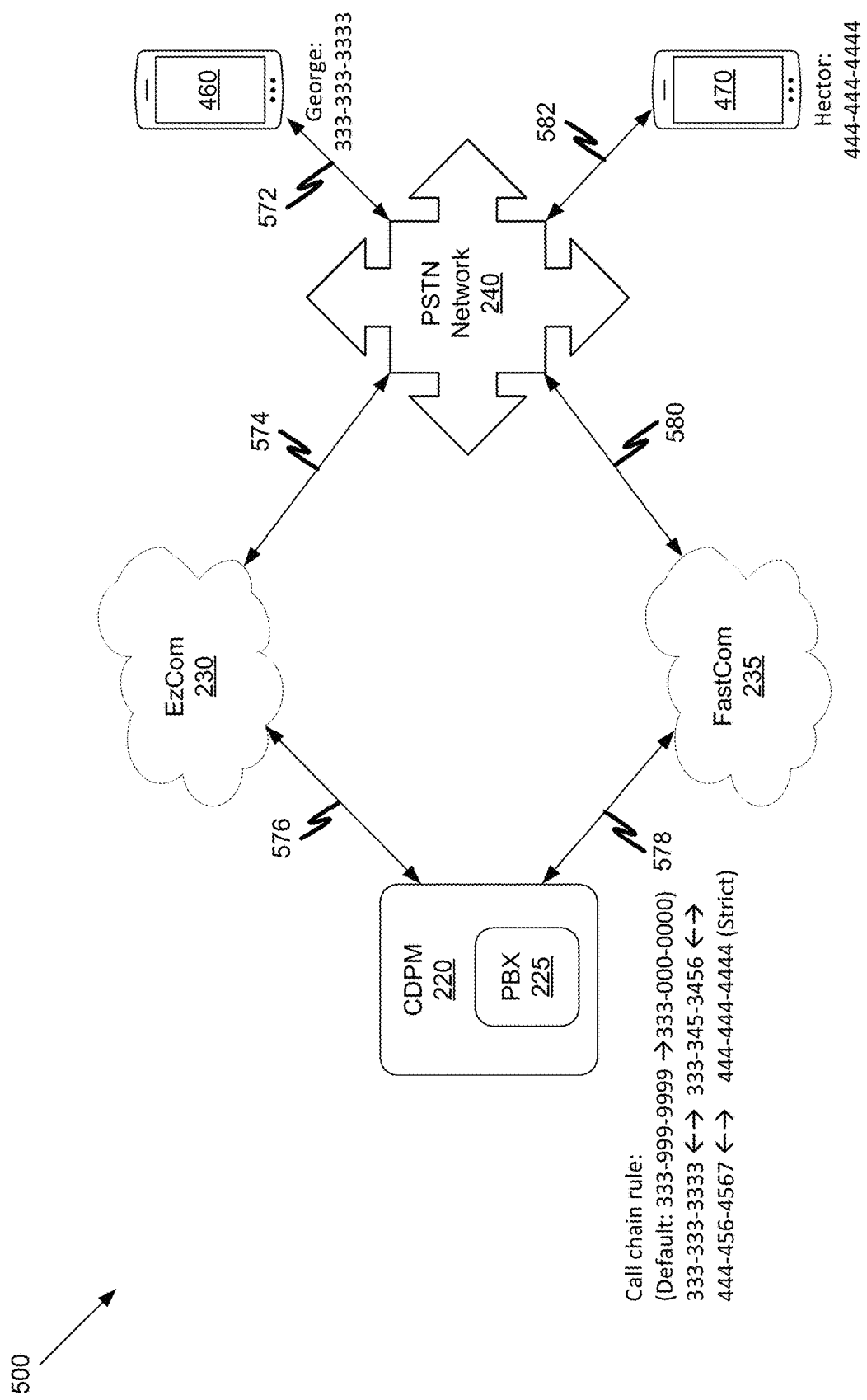
FIG. 5 depicts a deployment of a system for facilitating non-associative telephonic and SMS text communications between users using a call chain in default mode.

FIG. 5 depicts a deployment of a system 500 for facilitating non-associative telephonic and SMS text communications between users using a call chain in default mode. As an example, George can make an entry in his phone's contacts list associating LocalPizzaInc with the number Alice gave him (333-345-3456) to reach Hector. When George (333-333-3333) calls 333-345-3456, the call proceeds as in the above example and reaches Hector. At 572, George dials the number he has been given to reach Hector (333-345-3456) from his device 160. At 574, the PSTN network 240 recognizes the number 333-345-3456 as belonging to EzCom 230 and forwards the call to EzCom 230.

EzCom 230 forwards the call to CDPM module 220 at 576. The CDPM module 220 sees that the call is for 333-345-3456, which is part of a call chain. The CDPM module 220 sees that the chain is in "strict" mode on Hector's end, so it will allow the call to proceed if it is from the configured endpoint of the chain: 333-333-3333. The CDPM module 220 sees that the calling number (333-333-3333) is listed as the endpoint number associated with 333-345-3456, so it allows the call to proceed. The CDPM module 220 reaches out to FastCom 235 (from which the next number in the chain is leased) at 578 and directs it to place a call from that leased number, 444-456-4567, to Hector's number, 444-444-4444 at 580. Once the call is placed and Hector answers at 582, the CDPM module 220 marshals the call audio back and forth between the two calls on the two SIP providers, so that George and Hector are able to converse telephonically.

If someone other than George decides to call the number to reach Hector, when the CDPM module 220 sees that the caller is not calling from the endpoint number (333-333-3333) that is associated with the leased number 333-345-3456, and that the chain is in "default" mode at that end, it directs EzCom 230 to make a call to 333-000-0000 from 333-999-9999, and the caller is connected to LocalPizzaInc.

Figure 6:
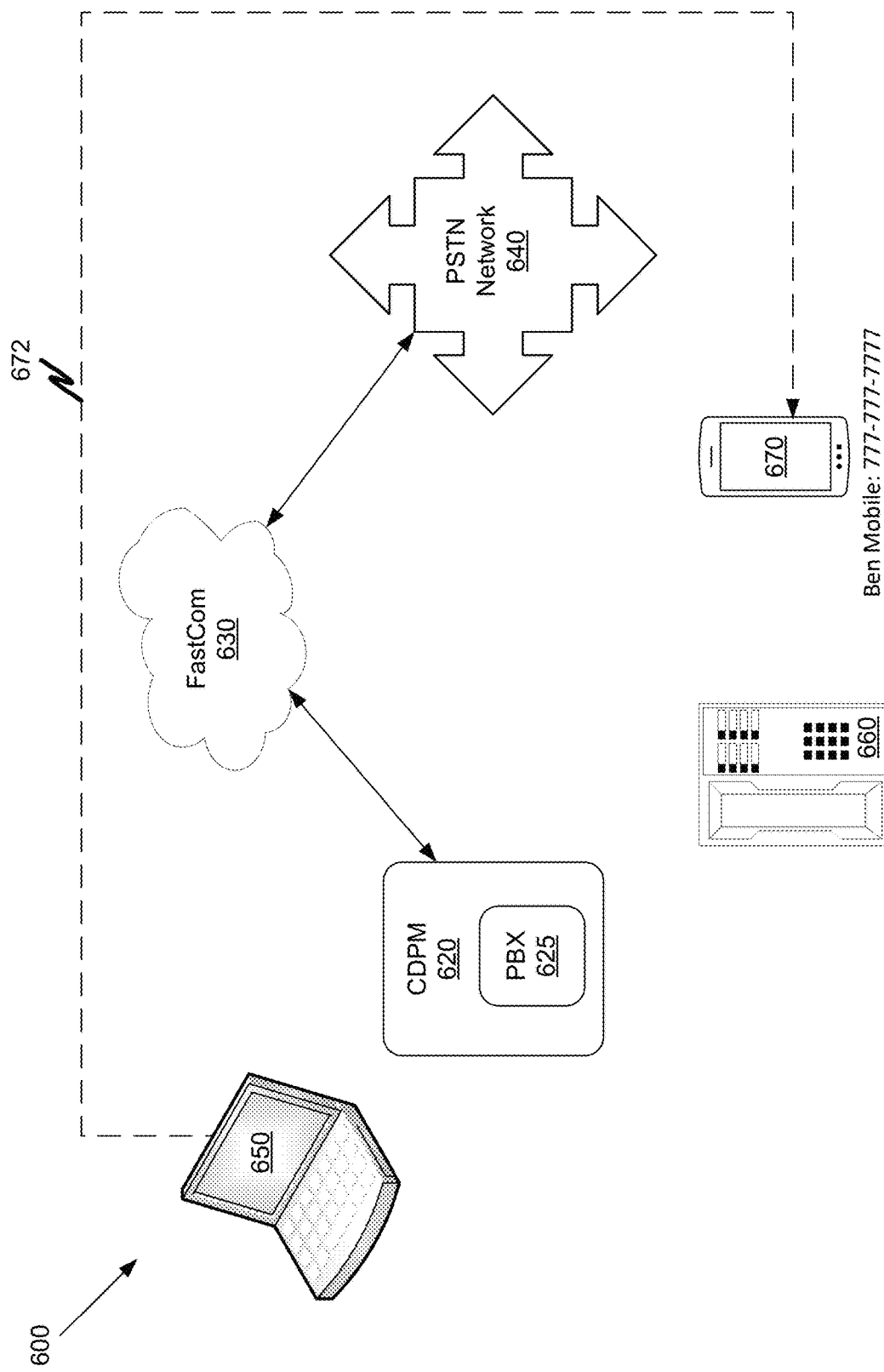
FIG. 6 depicts a system for managing multiple personas using a call chain for each persona.

FIG. 6 depicts a system 600 for managing multiple personas using a call chain for each persona. The system 600 comprises a CDPM module 620 with PBX 625, a SIP provider FastCom 630, and a PSTN network 640. Ben (whose phone number is 777-777-7777, and who has a PBX-connected VoIP phone on his desk at extension 888)

hands out business cards showing him as being various different personas: Barry the Baker, Bill the Builder, and Blaine the Blacksmith.

Alice, the system administrator, leases six numbers from FastCom 630. To create separation between the personas, she leases them in pairs, with each pair being in a different area code:

123-111-1111, 123-222-2222;
234-333-3333, 234-444-4444;
345-555-5555, 345-666-6666.

In the CDPM module console on a laptop 650, Alice creates three personas for Ben in the CPDM module 620:

123-111-1111→123-222-2222→777-777-7777 (also ring extension 888)
234-333-3333→234-444-4444→777-777-7777 (also ring extension 888)
345-555-5555→345-666-6666→777-777-7777 (also ring extension 888).

Alice uses the laptop 650 to set up outbound routes such that if someone who has authenticated to the PBX and has a PBX dialtone prefixes a dialed number with a particular digit, the call will originate from an associated leased number:

Prefix: 7, originating number: 123-111-1111
Prefix: 8, originating number: 234-333-3333
Prefix: 9, originating number: 345-555-5555.

At 672, Alice gives Ben a list of the numbers she leased and how they are configured. Ben has business cards printed:

Barry the Baker, 123-111-1111;
Bill the Builder, 234-333-3333; and
Blaine the Blacksmith, 345-555-5555.

Ben also sets up entries in his contact list on his device 670:

"Barry Baker" 123-222-2222;
"Bill Builder" 234-444-4444; and
"Blaine Blacksmith" 345-666-6666.

Figure 7:
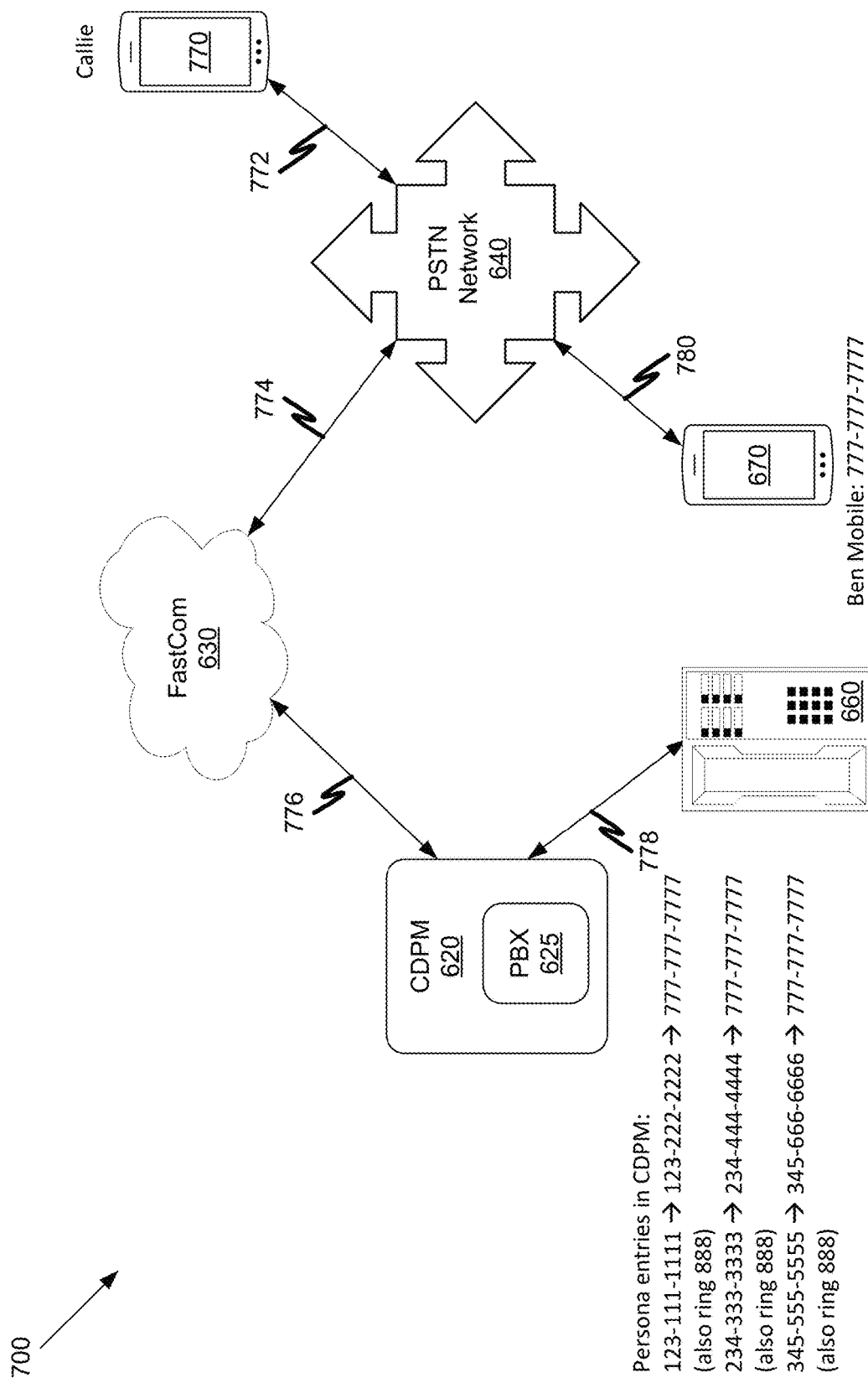
FIG. 7 depicts a first scenario in which someone calls a first persona, and a user answers.

FIG. 7 depicts a first scenario in which someone calls a first persona, and a user answers. The caller uses a cellular or landline phone 770 to call the number associated with the first persona at 772. The SIP Provider FastCom 630 receives the call at 774 and initiates a connection to the CDPM module 620 via SIP/VoIP. The CDPM module 620 receives the call at 776 and extracts the following from the information provided by the SIP Provider: the caller's number and the leased number the caller called. The CDPM module 620 determines which the user owns the persona associated with the leased number that was called. The CDPM module 620 determines the leased number that is associated with the user's cellular of landline phone for the first persona. The CDPM module 620 initiates a call to user via the second leased number at 776, to Ben's cellular and landline phone 670. The call is received by Ben's cell phone 670 at 780. If any PBX-only extensions have been associated with the Ben's account, the CDPM module 620 can simultaneously ring the PBX-only extensions 660 as well at 778.

When the user answers the call on any of the ringing lines, he is presented with the option to:

(1) accept the call immediately, in which case the caller and the user are connected through the CDPM module 620 and can have a phone conversation as normal;
(2) reject the call, in which case the caller will be directed to voicemail; or
(3) hear the caller's number before deciding, in which case the CDPM module 620 will use the PBX software's automated text-to-speech capability to read the caller's number from caller ID to the user, at which point the user will then have the opportunity to accept or reject the call.

As an example, Callie has one of Barry's business cards, and wants to talk about bread. At 772, Callie calls the number 123-111-1111 on the business card from her device 770. At 774, the PSTN network 640 recognizes the number 123-111-1111 as belonging to FastCom 630 and forwards the call to FastCom 630. FastCom 630 (from whom the number was leased) directs the call to the CDPM module 620 at 776. The CDPM module 620 makes note of the caller's number, and the recipient's number. The CDPM module 620 sees that the recipient number is in a defined persona and looks up the associated leased number (123-222-2222) and the endpoint number (777-777-7777) for that persona. At 776, the CDPM module 620 directs FastCom 630 to initiate a call from 123-222-2222 to Ben's cell phone 670 with number 777-777-7777. The CDPM module 620 rings Ben's PBX VoIP extension 660, at the same time.

On Ben's cell phone 670, because of the contact list entries, "Barry the Baker" is shown as the caller, so Ben knows who he is supposed to answer as. Ben either picks up the ringing VoIP phone 660, or answers his cell phone 670. The CDPM module 620 presents him with the option to accept the call, reject the call, or hear the caller's number. Ben chooses to hear the caller's number, so the CDPM module 620 (using text-to-speech) reads back Callie's number, then gives Ben the option to accept or reject the call. Ben chooses to accept the call. The CDPM module 620 connects the call from Callie and the one it made to Ben. Ben answers as Barry the Baker, and he and Callie have a conversation.

Figure 8:
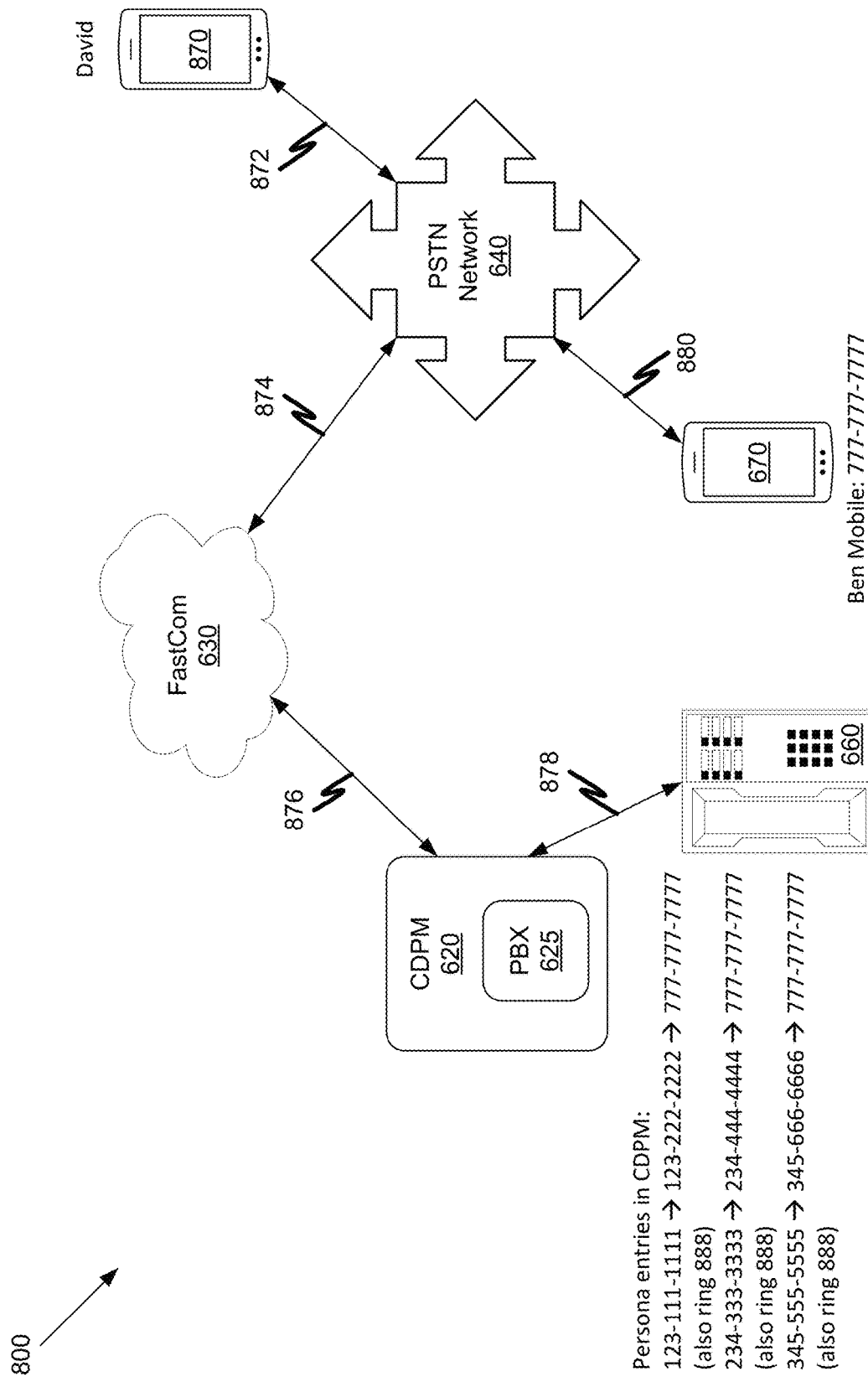
FIG. 8 depicts a second scenario in which someone calls a first persona, and a user does not answer.

FIG. 8 depicts a second scenario in which someone calls a first persona, and a user does not answer. All steps proceed as in the first scenario above, unless the user does not accept the call on any ringing extension, at which point: the caller will be directed to the voicemail subsystem of the CDPM module 620. If the caller leaves a voicemail before hanging up, that voicemail will be stored in the CDPM module 620 voicemail system, not in the device-specific or landline-specific voicemail account of any of the user's phones. If there are PBX-attached VoIP phones associated with the user, and they have voicemail-indicators, the user will be able to see that there is a voicemail waiting. Optionally, if a cellular phone number is associated with the user's persona, an SMS text message may be sent to that number from the user-facing persona number, letting the user know that there is voicemail waiting. At any time, the user can check for and listen to waiting voicemails by either:

(1) picking up a PBX-connected VoIP extension and dialing the voicemail prefix and PIN, or
(2) dialing the user-facing number for the appropriate persona from any landline or cellular phone, dialing a voicemail code, and then entering the PIN.

In this way, all voicemail for personas is managed off of the user's physical landline and cellular devices, and no trace of any caller or any voicemail from a caller can be found on any of these devices at any time.

As an example, David has one of Barry's business cards, and wants to talk about buildings. At 872, David, from his device 870, calls the number 234-333-3333 on the card. At 874, the PSTN network 640 recognizes the number 234-333-3333 as belonging to FastCom 630 and forwards the call to FastCom 630. FastCom 630 directs the call to CDPM module 620 at 876. The CDPM module 620 makes note of the caller's number and the recipient number. The CDPM module 620 sees that the recipient number is in a defined persona and looks up the associated leased number (234-444-4444) and the endpoint number (777-777-7777) for the persona. The CDPM module 620 directs FastCom 630 to initiate a call from 234-444-4444 to Ben's cell phone 670 with number 777-777-7777 at 880. Because Ben also has a PBX VoIP extension, the CDPM module 620 rings the PBX extension at 878.

On Ben's cell 670, because of the contact list entries, "Bill Builder" is shown as the caller, so Ben knows who he is supposed to answer as. Ben chooses not to pick up either his VoIP extension 660 or his cell phone 670, so David is directed to voicemail. David leaves a message that is stored on the CDPM module 620, not on Ben's cell phone 670. Ben's desktop PBX-connected VoIP phone 660 shows a "Message Waiting" indicator. The CDPM module 620 directs FastCom 630 to send an SMS text message from 234-444-4444 to Ben's cell (777-777-7777) indicating that he has voicemail waiting. Ben receives the text message on his cell phone 670. Later on, Ben chooses to listen to "Bill's" voicemail. From his cell phone 670, he calls the "Bill Builder" number. FastCom 630 connects the call to the CDPM module 620. The CDPM module 620 sees that the call is to a persona number and is from an associated number. The CDPM module 620 asks for a PIN. After providing the PIN, Ben can listen to the voicemail that was left for Bill, using the prompts.

Figure 9:
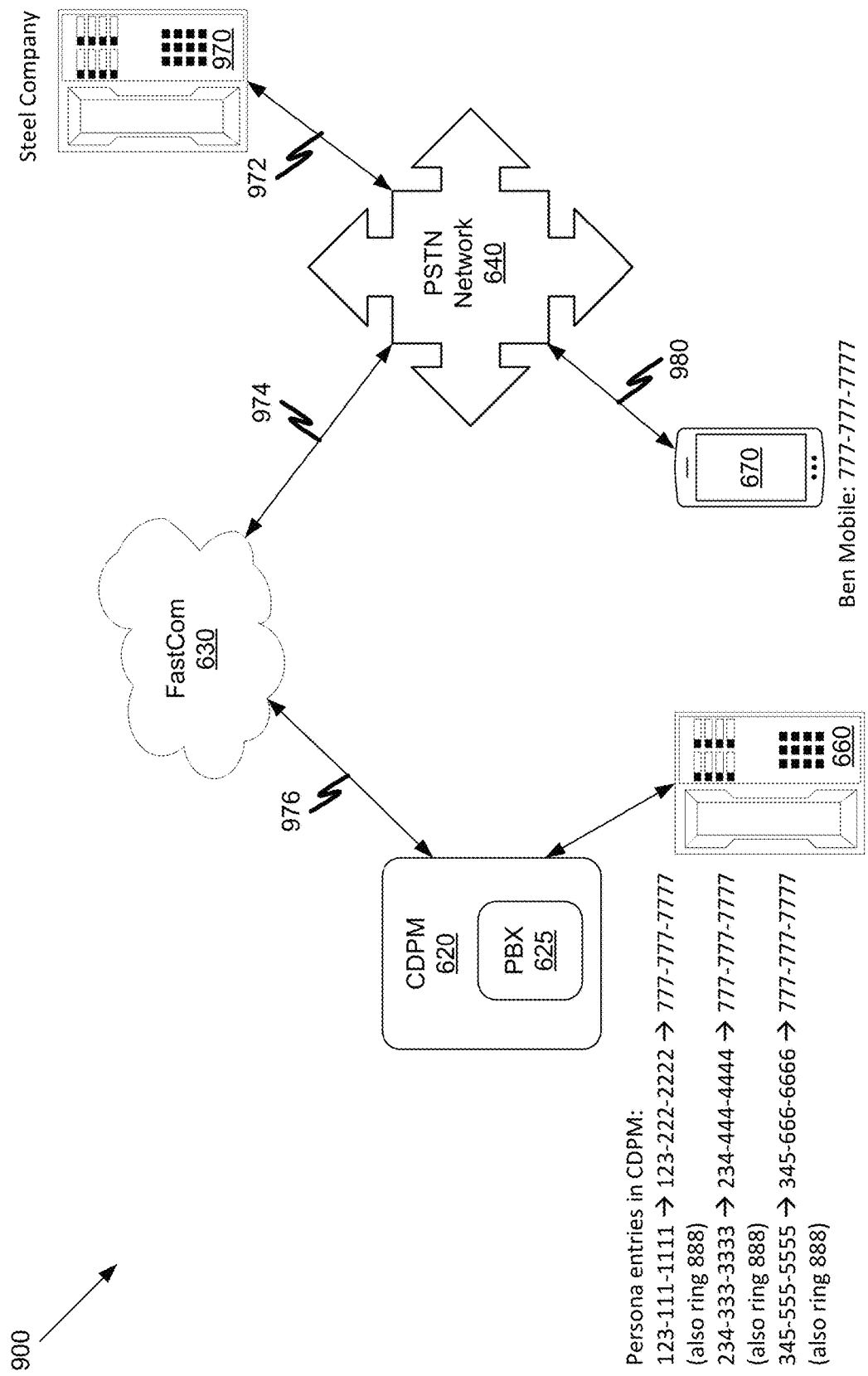
FIG. 9 depicts a third scenario in which a user wishes to call a third party while appearing to call from a particular persona number.

FIG. 9 depicts a third scenario in which a user wishes to call a third party while appearing to call from a particular persona number. The user can either:

(1) dial the leased number associated with one of his personas from a cellular or landline phone and then enters a special code and PIN, after which he is presented with a dial tone by the CDPM module 620; or (2) pick up a PBX-connected VoIP extension and receives a dial tone from the CDPM module 620.

The user then dials the phone number of the desired third party, including a prefix that indicates to the CDPM module 620 which of his public-facing persona numbers to use to initiate the call. The CDPM module 620 determines which leased number to initiate the call from, and makes use of the SIP provider's API for the correct provider, and initiates a call to the third-party number the user dialed. The CDPM module 620 connects the call from the user and the call to the third party, so that the third party believes he has been called directly from the leased number associated with the user's selected persona.

As an example, Ben wants to call a steel supplier from his "Blaine the Blacksmith" persona. From Ben's cell phone 670 with number 777-777-7777, Ben dials the "Blaine" number (345-666-6666) at 980. FastCom 630 receives the call at 974 and connects the call to the CDPM module 620 at 976. The CDPM module 620 sees that the call is to a persona number and is from an associated number. The CDPM module 620 asks for a PIN. Ben provides his PIN. The CDPM module 620 gives Ben a dial tone. Ben dials '9' to indicate that he wants to use 345-555-5555 as his originating number, then dials the number of the steel supplier.

At 976, the CDPM module 620 directs FastCom 630 to initiate a call from 345-555-5555 to the number that Ben dialed. FastCom 630 initiates the call at 974. The steel company sees 345-555-5555 on caller ID at 972. The CDPM module 620 then connects the two calls together so that when the steel company answers on device 970, Ben (pretending to be Blaine) can speak with them. Because the steel company received 345-555-5555 as the caller ID for the call, if the steel company calls it back, the call will route through the SIP provider FastCom 630 and the CDPM module 620 as described above, and Ben's phone 670 will indicate to him that he should answer as "Blaine".

Figure 10:
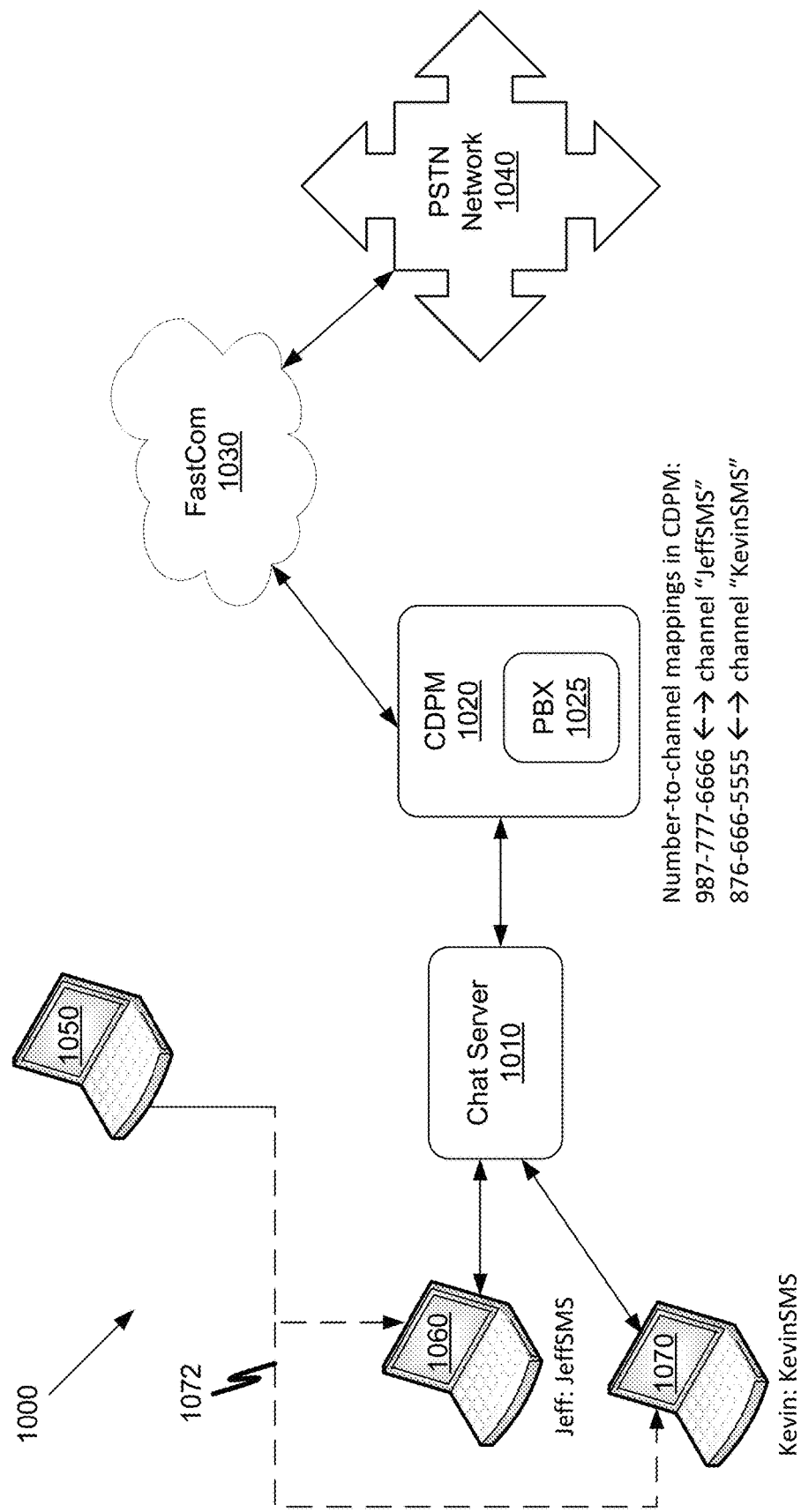
FIG. 10 depicts a setup of a system for facilitating SMS-to-chat communication for users in a location where cellular connectivity is not available.

FIG. 10 depicts a setup of a system 1000 for facilitating SMS-to-chat communication for users in a location where cellular connectivity is not available. The system 1000 comprises a chat server 1010, a CDPM module 1020 with PBX 1025, a SIP provider 1030, e.g., FastCom, and a PSTN network 1040. When one or more users wishes to be able to have SMS text conversations with one or more third parties, but neither can have an SMS-enabled device (for technical or administrative reasons) or wishes to have team access to the SMS conversation without revealing that fact to the third party, the CDPM module 1020, in combination with a text chat-based collaboration tool (e.g. Mattermost) can be used to facilitate the interaction.

One or more SMS-capable numbers are leased from one or more SIP Providers and are made available to the CDPM module 1020 for its use. The CDPM module 1020 is configured with the URL of a compatible text chat service (e.g., Mattermost), as well as suitable administrative credentials to that service. The CDPM module 1020 configures the SIP provider(s) such that any SMS text messages that arrive on any of the configured leased numbers are to be forwarded to the PBX 1025. The CDPM module 1020 connects to the chat service and creates an individual chat channel for each of the leased numbers that will be used in this configuration. The CDPM module 1020 then begins waiting for either an SMS text message to arrive from the SIP Provider 1030, or for a user on the chat service 1010 to enter a specially-formatted message to indicate that the message is supposed to be sent.

When a third-party sender sends an SMS text message to one of the configured leased numbers, the SIP Provider 1030 forwards that message to the PBX 1025. The CDPM module 1020 receives the message. If this is the first time that the sender has sent a message to this CDPM module 1020, CDPM module 1020 creates a unique user ID for the sender's number on the chat service. A system administrator may optionally choose to associate a nickname with the automatically-created user ID. The CDPM module 1020 posts the content of the SMS message on the chat service 1010, in the channel for the leased number that the message was sent to, using the user ID or (if configured) nickname associated with the sender's number.

All users on the chat service that the system administrator has granted access to the channel associated with the leased number will be able to read the contents of the SMS message that was sent. Users on the chat service with access to channel associated with a leased number may send messages targeted for a particular number using whatever nomenclature that chat service specifies (e.g. "@userid" or "@nickname") to indicate that the message is for a particular third-party recipient.

The CDPM module 1020 can monitor all leased-number channels for targeted messages of that type, and can capture them and determine the leased number associated with the message and the third-party number of the recipient. The CDPM module 1020 can use the API of the appropriate SIP provider for the leased number to create and send an SMS text message to the recipient number, from the correct leased number, with the body of the message being the content of the message that the user typed in the chat service channel.

As an example, Jeff and Kevin are in sales and want to communicate with customers via SMS text messaging, but company policy forbids employees from having cell phones at their desks. Alice, from her laptop 1050, leases two numbers from FastCom 1030: 987-777-6666 for Jeff and 876-666-5555 for Kevin. Alice builds and deploys a chat server 1010. Alice configures the CDPM module 1020 to be aware of the chat server 1010. Alice creates two new SMS-to-chat entries in the CDPM module 1020: 987-777-6666 ←→channel "JeffSMS" and 876-666-5555 ←→channel "KevinSMS." At 1072, Alice sends to Jeff's device 1060 and Kevin's device 1070 their respective numbers to hand out to people who need to reach them.

Figure 11:
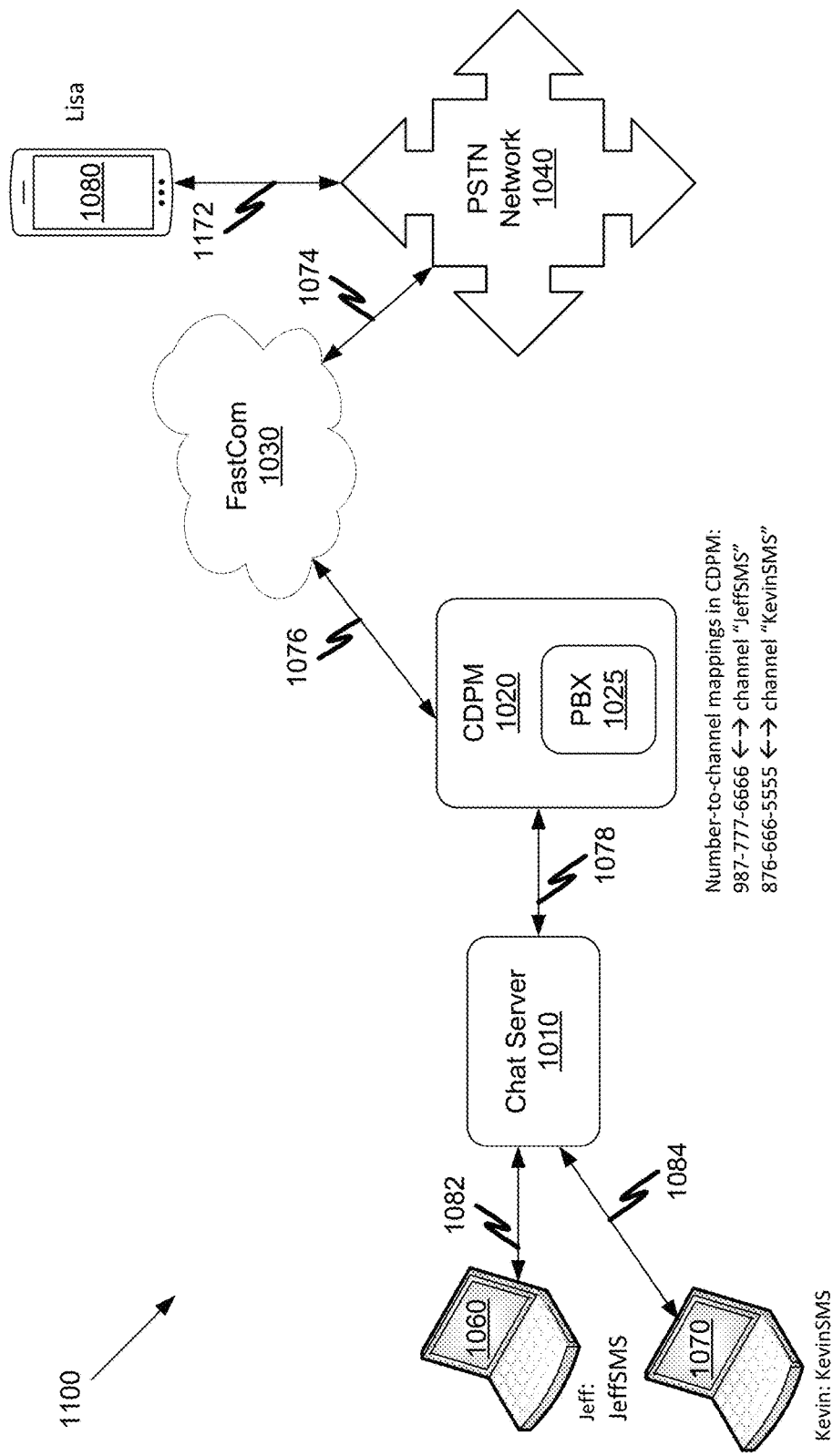
FIG. 11 depicts a deployment of a system for facilitating SMS-to-chat communication for users in a location where cellular connectivity is not available.

FIG. 11 depicts a deployment of a system 1000 for facilitating SMS-to-chat communication for users in a location where cellular connectivity is not available. As an example, Lisa (phone number 543-333-2222) is a new potential customer of Jeff's. Lisa sends an SMS text message at 1172 to Jeff's device 1060 with number 987-777-6666 from her device 1080. FastCom 1030 receives the message at 1174 and forwards the message to the CDPM module 1020 at 1176. The CDPM module 1020 receives the message and notes the sender's number and the recipient number. The CDPM module 1020 determines that the recipient number is one that is associated with the "JeffSMS" chat channel. The CDPM module 1020 determines that this is the first time that 543-333-2222 has sent a message to this chat server, so it uses the chat server API at 1178 to create a new user, "@5433332222", and adds it to the "JeffSMS" channel. The CDPM module 1020 uses the chat server API to post a message to the "JeffSMS" message channel, from user "@5433332222", containing the contents of the SMS message Lisa sent at 1082 and 1084.

Jeff and Kevin collaborate closely on accounts, so Kevin (who also has access to the "JeffSMS" channel is able to read Lisa's message. Because Jeff is in a meeting and the message is time-sensitive, at 1084 Kevin responds to it from his device 1070, on the chat server 1010, by posting a message in the "JeffSMS" channel, beginning with "@5433332222". Because the CDPM module 1020 registered the "@5433332222" account with the chat server 1010, the CDPM module 1020 receives a notification that a message was sent to that account by name. At 1078, the CDPM module 1020 retrieves the message from the chat server 1010, noting that it was sent in the "JeffSMS" channel, which is associated with Jeff's number, 987-777-6666, and that the message was sent to @5433332222, which is associated with the third party phone number 543-333-2222. The CDPM module 1020 uses the FastCom API to create an SMS text message, from 987-777-6666 to 543-333-2222, with the contents of the message being whatever Kevin typed in the chat message.

Figure 12:
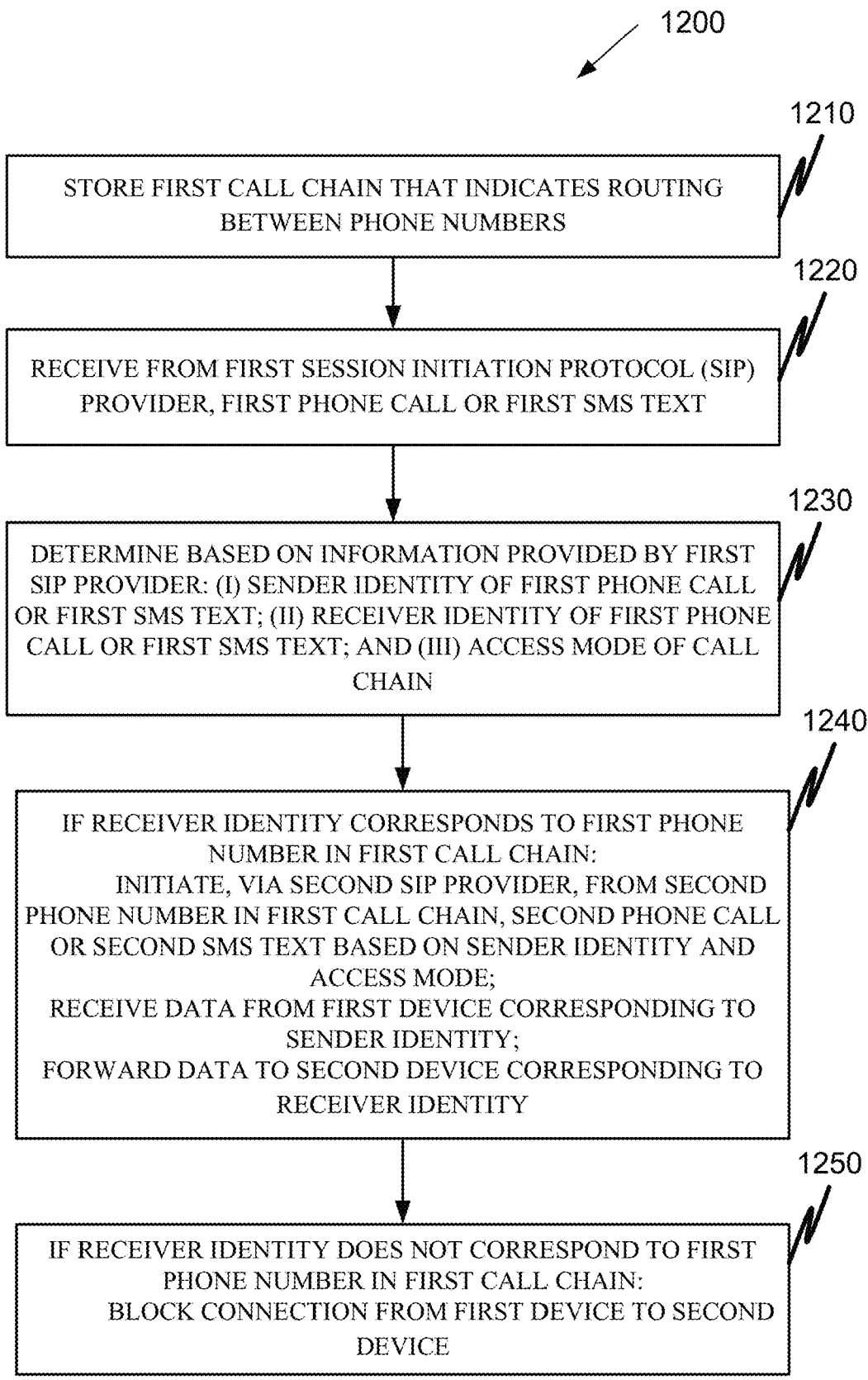
FIG. 12 is a flow diagram depicting a method for managing non-associative communications between devices.

FIG. 12 depicts a flow diagram 1200 for a method for managing non-associative communications between devices. At 1210, a first call chain that indicates a routing between phone numbers is stored. A first phone call or a first SMS text is received from a first session initiation protocol (SIP) provider at 1220. At 1230, based on information provided by the first SIP provider, (i) a sender identity of the first phone call or the first SMS text; (ii) a receiver identity of the first phone call or the first SMS text; and (iii) an access mode of the call chain are determined. At 1240, if the receiver identity corresponds to a first phone number in the first call chain, a second phone call or a second SMS text is initiated via a second SIP provider, from a second phone number in the first call chain, based on the sender identity and the access mode. Data is received from a first device corresponding to the sender identity. The data is forwarded to a second device corresponding to the receiver identity. At 1250, if the receiver identity does not correspond to a first phone number in the first call chain, a connection from the first device to the second device is blocked.

Examples have been used to describe the invention herein, and the scope of the invention may include other examples.

It is claimed:

1. A system comprising:
   at least one data processor; and
   memory comprising instructions which, when executed by the at least one data processor, result in operations comprising:
     receiving, from a first session initiation protocol (SIP) provider, a first communication; and
     determining, based on information provided by the first SIP provider: (i) a sender identity of the first communication; (ii) a receiver identity of first communication; and (iii) an access mode of a first call chain associated with the first communication; and
     selectively initiating or blocking, based on the determining, communication between a first device corresponding to the sender identity and a second device corresponding to the receiver identity.

2. The system of claim 1, wherein the first communication is a first phone call or a first SMS text.

3. The system of claim 1, wherein the operations further comprise:
   storing the first call chain that indicates a routing between phone numbers.

4. The system of claim 1, wherein if the receiver identity corresponds to a first phone number in the first call chain, the operations further comprise:
   initiating, via a second SIP provider, from a second phone number in the first call chain, a second communication based on the sender identity and the access mode.

5. The system of claim 4, wherein if the receiver identity corresponds to a first phone number in the first call chain, the operations further comprise:
   receiving data from the first device corresponding to the sender identity.

6. The system of claim 5, wherein if the receiver identity corresponds to a first phone number in the first call chain, the operations further comprise:
   forwarding the data to the second device corresponding to the receiver identity.

7. The system of claim 6, wherein if the receiver identity does not correspond to a first phone number in the first call chain, the operations further comprise:
   blocking a connection from the first device to the second device.

8. The system of claim 7, wherein the first SIP provider and the second SIP provider are different, and the first SIP provider provides the first phone number in the first chain, and the second SIP provider provides the second phone number in the first chain.

9. The system of claim 7, wherein the operations further comprise:
   providing the first phone number to the first device and the second phone number to the second device prior to receiving the phone call or the SMS text.

10. The system of claim 1, wherein the access mode corresponds to a strict mode indicating a one-to-one mapping between the sender identity and the receiver identity and the operations further comprise:
    forwarding first communication from the first device to the second device or from the second device to the first device; and dropping a second communication from another device to the first device or from the another device to the second device.

11. The system of claim 1, wherein the access mode corresponds to a default mode indicating a one-to-one mapping between the sender identity and the receiver identity and the operations further comprise:
forwarding the first communication from the first device to the second device or from the second device to the first device; and
forwarding, to a known identity not present in the first call chain, a second communication from another device to the first phone number.

12. The system of claim 1, wherein the operations further comprise:
storing a plurality of personas for the second device, wherein each persona in the plurality of personas corresponds to a second call chain comprising a phone number corresponding to that persona.

13. The system of claim 1, wherein a first call record on the first device does not include the receiver identity, and a second call record on the second device does not include the sender identity.

14. A computer-implemented method comprising:
receiving, from a first session initiation protocol (SIP) provider, a first communication; and
determining, based on information provided by the first SIP provider: (i) a sender identity of the first communication; (ii) a receiver identity of first communication; and (iii) an access mode of a first call chain associated with the first communication; and
selectively initiating or blocking, based on the determining, communication between a first device corresponding to the sender identity and a second device corresponding to the receiver identity.

15. The method of claim 14, wherein the first communication is a first phone call or a first SMS text.

16. The method of claim 15 further comprising:
storing the first call chain that indicates a routing between phone numbers.

17. The method of claim 15 further comprising:
if the receiver identity corresponds to a first phone number in the first call chain:
initiating, via a second SIP provider, from a second phone number in the first call chain, a second communication based on the sender identity and the access mode;
receiving data from the first device corresponding to the sender identity; and
forwarding the data to the second device corresponding to the receiver identity.

18. The method of claim 17 further comprising:
if the receiver identity does not correspond to a first phone number in the first call chain:
blocking a connection from the first device to the second device.

19. The method of claim 18, wherein the first SIP provider and the second SIP provider are different, and the first SIP provider provides the first phone number in the first chain, and the second SIP provider provides the second phone number in the first chain.

20. A non-transitory computer readable storage medium storing one or more programs configured to be executed by one or more data processors, the one or more programs comprising instructions comprising:
receiving, from a first session initiation protocol (SIP) provider, a first communication; and
determining, based on information provided by the first SIP provider: (i) a sender identity of the first communication; (ii) a receiver identity of first communication; and (iii) an access mode of a first call chain associated with the first communication; and
selectively initiating or blocking, based on the determining, communication between a first device corresponding to the sender identity and a second device corresponding to the receiver identity.

* * * * *